United States Patent [19]

Atkins

[11] Patent Number: 4,998,789
[45] Date of Patent: Mar. 12, 1991

[54] KALEIDOSCOPES FOR VIEWING OBJECTS AND METHOD OF REPRODUCING VIEWED KALEIDOSCOPIC IMAGES

[76] Inventor: Janice Atkins, 3835 Main #611, Kansas City, Mo. 64111

[21] Appl. No.: 461,931

[22] Filed: Jan. 8, 1990

Related U.S. Application Data

[62] Division of Ser. No. 294,481, Jan. 6, 1989, abandoned.

[51] Int. Cl.⁵ ............................................. G02B 23/00
[52] U.S. Cl. ................................................... 350/4.1
[58] Field of Search ................................. 350/4.1, 4.2

[56] References Cited

U.S. PATENT DOCUMENTS

| | | | |
|---|---|---|---|
| 2,297,767 | 10/1942 | Hunt | 350/4.2 X |
| 2,697,380 | 12/1954 | Wyser | 350/4.1 X |
| 4,061,414 | 12/1977 | Price | 350/4.1 |
| 4,793,671 | 12/1988 | Palochak et al. | 350/4.1 |

FOREIGN PATENT DOCUMENTS 279836  10/1914  Fed. Rep. of Germany ....... 350/4.1

*Primary Examiner*—Richard A. Wintercorn
*Attorney, Agent, or Firm*—Michael Yakimo, Jr.

[57] ABSTRACT

A method of making a kaleidoscopic drawing utilizes first and second geometric figures corresponding to the perimetrical/cross sectional configuration of a mirror array extending through a kaleidscope. Corresponding vertices of the figures are connected to present planar surfaces corresponding to the actual mirrors of the array. The reflected image is then drawn onto the planar surface as viewed by the artist. Various kaleidoscopes are shown which can be used with and without the described method.

6 Claims, 4 Drawing Sheets

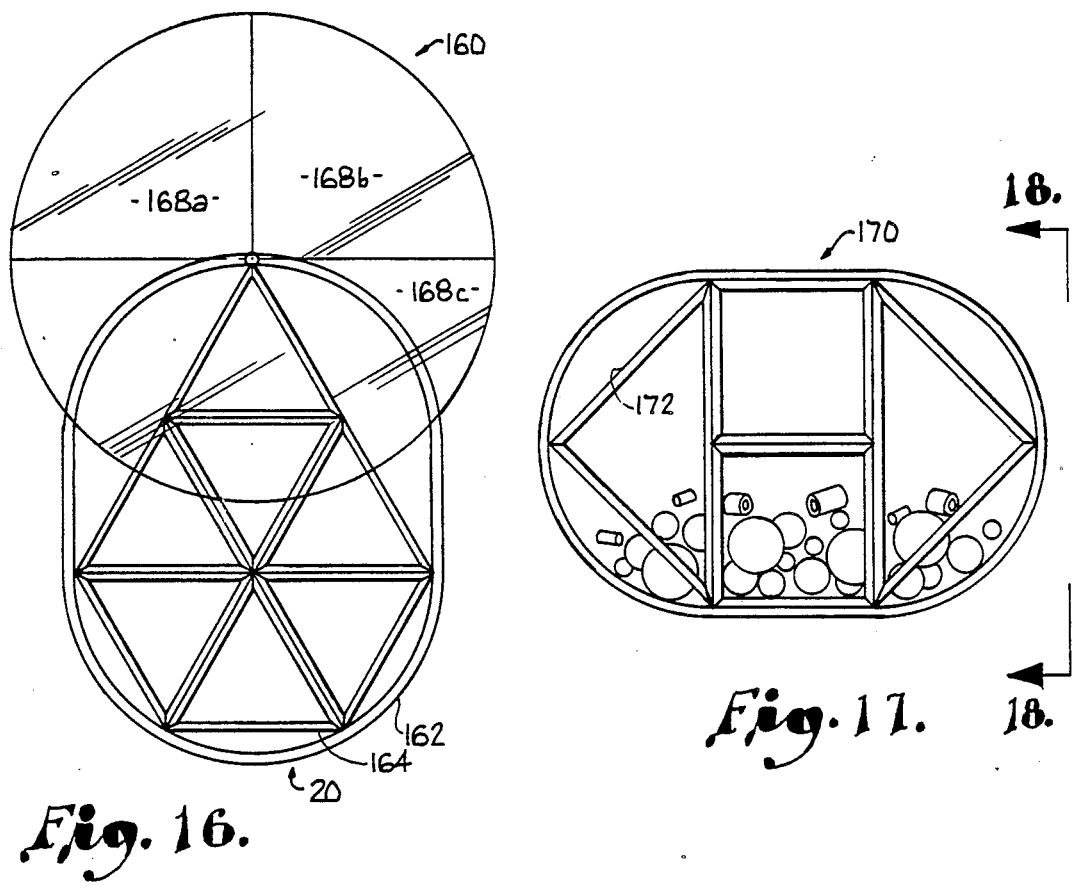
Fig. 16.
Fig. 17.
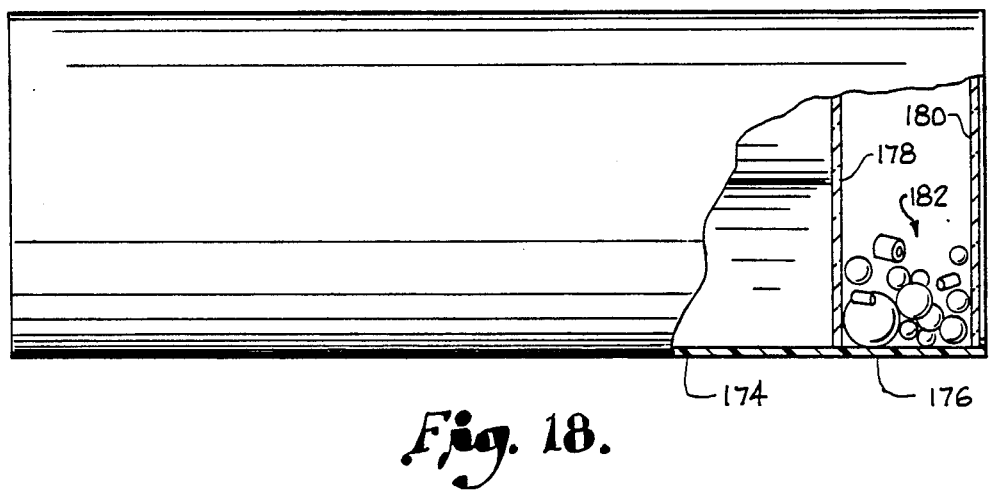
Fig. 18.

# KALEIDOSCOPES FOR VIEWING OBJECTS AND METHOD OF REPRODUCING VIEWED KALEIDOSCOPIC IMAGES

This application is a division, of application Ser. No. 294,481, filed Jan. 6, 1989, now abandoned.

BACKGROUND OF THE INVENTION

This invention relates to kaleidoscopes, having variously configured mirror arrays, for viewing objects and a method for reproducing the viewed objects in a kaleidoscopic drawing.

Kaleidoscopes have been used to produce eye pleasing geometric patterns and/or designs. Heretofore there has been no method available to translate the viewed object into a drawing so as to permanently capture the viewed object in a kaleidoscopic form. It has long been recognized that attractive and unique geometric designs may be generated by means of kaleidoscopic reflections. However, it has been difficult to economically and cost-effectively duplicate this type of reflection. One attempt has been made to record a kaleidoscopic image via the use of a camera. Also the kaleidoscopic image has been limited to conventionally patterned mirror arrays. These arrays in turn limit the geometrical pattern of the viewed object and the resulting produced image.

In response thereto, I have invented a number of kaleidoscopes having variously configured mirror arrays therein so as to present novel geometrical patterns and/or designs of viewed objects. Such kaleidoscopes include those allowing a direct view of the object through the open distal end as well as indirect views by which the object is viewed through objects such as crystals or a color wheel located at the distal and/or proximal end of the kaleidoscope. In conjunction with such kaleidoscopes, I have invented a novel method of artistically reproducing the viewed image so as to permanently capture the kaleidoscopic image in the appropriate geometrical pattern/design.

Accordingly a general object of this invention is to provide viewing apparatus and a method of making a kaleidoscopic reproduction of a viewed image.

Another object of this invention, as aforesaid, is to provide a method and apparatus for reproducing kaleidoscopic type images without the need for expensive equipment.

A more particular object of this invention is to provide certain kaleidoscopes having mirror arrays of different geometric cross-sectional configurations with opposed viewing ends therein.

Still another object of this invention is to provide certain kaleidoscopes having a prism at least at one of the ends thereof for affecting the reflected light from the viewed image.

Another particular object of this invention is to provide certain kaleidoscopes having various objects at least at one of the ends thereof for affecting the reflections of the viewed image.

A further particular object of this invention is to provide a kaleidoscope having a color adjustable wheel at one end through which desired objects are viewed.

Other objects, advantages and features of this invention will become more apparent from the following description taken in conjunction with the accompanying drawings.

BRIEF DESCRIPTION OF THE DRAWINGS

FIG. 16 is a planar end view of an alternative kaleidoscope design illustrating a pentagonal mirror array therein with a color wheel at one end thereof.

FIG. 17 is a planar view of an alternative kaleidoscope design illustrating an upper and lower square mirror array as flanked by triangular mirrors with marbles and beads located at one end thereof.

FIG. 18 is a side view of the kaleidoscope of FIG. 17, taken along lines 18—18 in FIG. 17, with a portion of the housing broken away to illustrate the marbles and beads at one end thereof.

DESCRIPTION OF THE PREFERRED EMBODIMENT

Figures 2, 3:
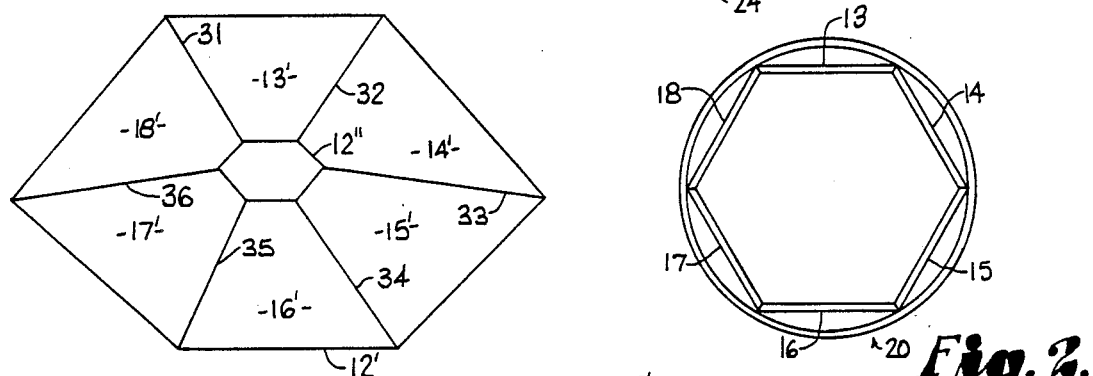
FIG. 2 is a planar end view of the kaleidoscopic of FIG. 1 and illustrating the cylindrical housing of the kaleidoscope surrounding the hexagonally configured mirror array therein.
FIG. 3 illustrates the basic kaleidoscopic drawing made in the method of reproducing a kaleidoscopic image.
Figure 4:
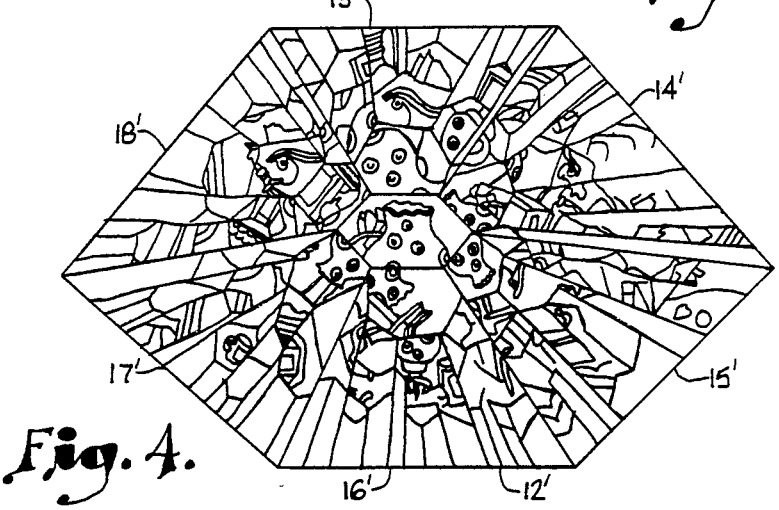
FIG. 4 illustrates the finished kaleidoscopic drawing of the lamp shown in FIG. 1.

Turning more particularly to the drawings, FIGS. 1–4 illustrate the apparatus used in the method of producing a kaleidoscopic drawing with FIG. 4 being indicative of the finished kaleidoscopic drawing.

In connection with said method, I select a lamp 500 as the object for which the kaleidoscopic drawing is to be made. It is understood that the selected object is according to the desire of the artist.

Figure 1:
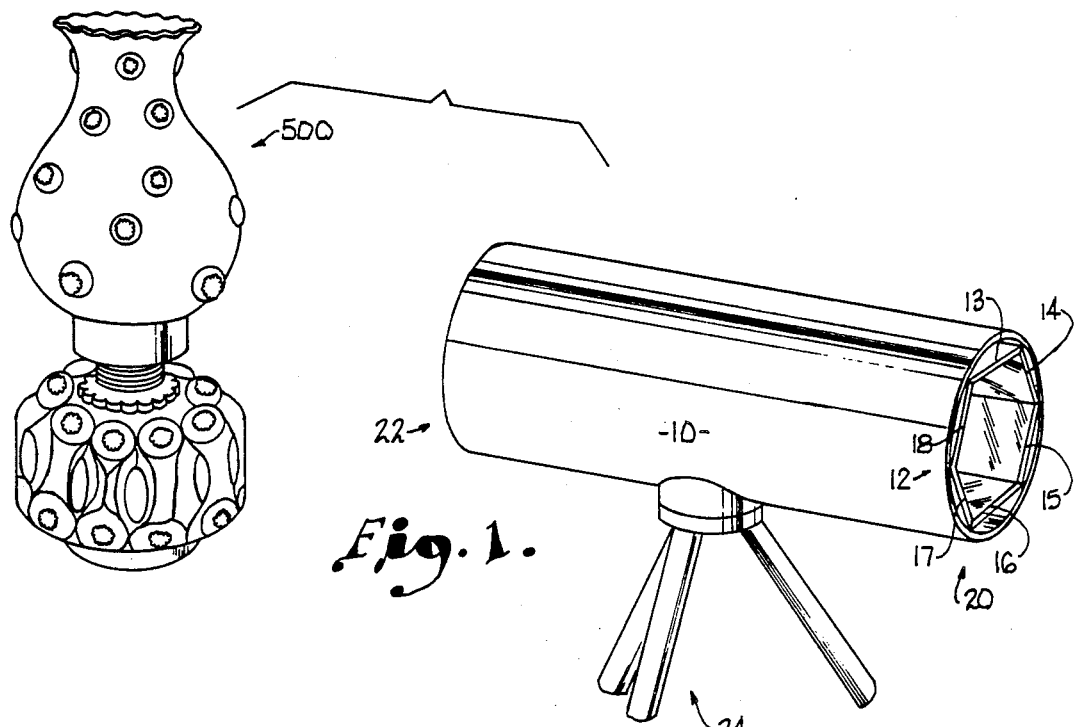
FIG. 1 is a perspective view illustrating an hexagonal kaleidoscope in position for obtaining a kaleidoscopic image of a decorative lamp.

FIG. 1 further illustrates a selected kaleidoscope having a tubular housing 10 through which extends an attached, hexagonal mirror array 12 comprising planar mirrors 13, 14, 15, 16, 17, 18. Although a hexagonal mirror array 12 has been selected, it is understood that kaleidoscopes having variously configured mirror arrays can be used inclusive of those kaleidoscopes to be subsequently described. Although only a front or proximal planar view is shown in FIG. 2, it is understood that such a proximal end view mirrors the distal and cross sectional end views of the mirror array 12 as the planar mirrors extend throughout the housing 12. Thus each of the mirrors of the mirror array 12 extends from one end 20 of the housing 12 to the opposed distal end 22 thereof. Upon viewing through the proximal end 20 a tunnel effect presents to the viewer a reduced hexagonal perimeter of the hexagonal mirror array 12 at the opposed distal end 22 thereof.

A tripod mount 24 is also shown upon which the hexagonal kaleidoscope is fixed so as to maintain the focus on the lamp 500. It is understood that such a mount 24 is an optional one.

Prior to focusing the kaleidoscope on the lamp 500, the artist selects a drawing surface and draws thereon a hexagonal configuration 12' which corresponds to the proximal, hexagonal, cross-sectional perimeter of the hexagonal mirror array 12. The actual dimensions of this first hexagonal illustration 12' are user selectable according to the desired dimensions of the finished drawing. As such the finished FIG. 4 drawing is shown larger than FIG. 3.

Subsequently a smaller hexagonal 12" is drawn within the original larger figure 12' so that it is centrally located therein. The figure 12" represents the cross-sectional area of the mirror array at the distal end thereof. It is understood that either the smaller 12" or larger 12' figures may be first drawn.

Subsequently lines 31, 32, 33, 34, 35, 36 are drawn which connect the common vertices between the relatively dimensioned hexagonal figures 12', 12". As such the FIG. 3 figure presents a hexagon 12' within a hexagon 12" similar to the tunnel effect presented upon viewing through the kaleidoscope. The various planar surfaces 13', 14', 15', 16', 17', 18' are formed by the lines connecting the common vertices. These surfaces, extending between the smaller 12" and larger 12' hexagonal figures, correspond to the extension of the planar mirrors 13, 14, 15, 16, 17, 18 between the front/proximal 20 and distal/rear 22 ends of the housing 10.

Upon completion of the basic drawing as shown in FIG. 3, the artist views the lamp 500 through the kaleidoscope. The artist then draws the portion of the reflected image shown on the actual mirror surfaces 13, 14, 15, 16, 17, 18 in the corresponding planar surfaces area 13', 14', 15', 16', 17', 18' in the FIG. 3 drawing. Upon repetitive steps of viewing and drawing a finished kaleidoscopic drawing, as shown in FIG. 4, will be presented. Portions of the viewed object 500, as reflected in each actual mirror and perceived by the artist, are drawn in each particular representative mirror surface 13'-18'. It is also noted that portions of objects other than the lamp 500 are shown in FIG. 4. These objects are objects that are in the room at the time of the drawing. Their presence is due to the fact that the mirrors 13-18 will contain images of objects surround the focused lamp 500. In the utilization of my above described kaleidoscopic drawing method, various kaleidoscopes having variously configured mirror arrays therein may be used. It is understood that for each kaleidoscope the basic method of reproducing the proximal cross-sectional perimeter of the mirror array with a reduced distal cross-sectional perimeter centrally located therein is used. Upon connecting the common vertices formed at the mirror junctures the physical mirror surfaces of the mirror array are represented on the drawing surface in planar form. Once so drawn the images reflected on each actual mirror surface are then drawn in the corresponding representative mirror surface.

Figure 5:
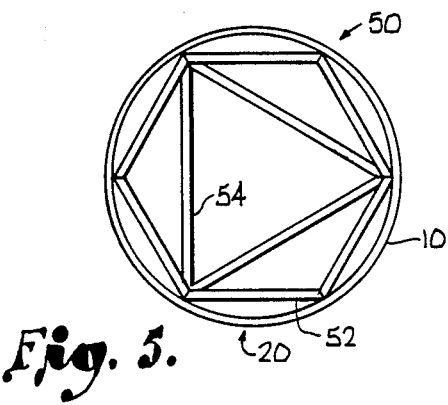
FIG. 5 is a planar end view of an alternative kaleidoscope design illustrating a combination hexagonal/triangular mirror array.

An alternative embodiment of a kaleidoscope 50 is as shown in FIG. 5. Therein is shown a proximal planar end view of the tubular housing having a combined hexagonal 52 and triangular 54 mirror array therein. It is understood that the hexagonal mirror array 52 extends from one end 20, through a portion of the longitudinal extent of the tubular housing 10, and ends centrally therein. At that point the triangular mirror array 54 initiates its extension and extends to the opposed distal end 22 of the housing 10. Either end 20, 22 may be the proximal or distal end during use. The images reflected onto the mirror arrays will vary according to which end is used as the proximal or distal end by the user. In practicing the above-described method the basic (FIG. 3) drawing for this particular configuration is a larger proximal hexagon and a smaller distal hexagon therein, corresponding to array 52 are first drawn. The common vertices are then line connected. Within the smaller hexagon first and second triangles of relatively reduced configuration, corresponding to mirror array 54, are then drawn. The corresponding vertices of the triangles are then connected. As such the various mirrors are so represented in planar form by the artist. The steps of viewing and drawing as above described can then be repeated.

Figure 6:
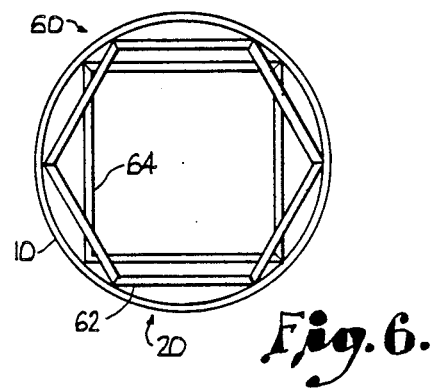
FIG. 6 is a planar end view of an alternative kaleidoscope design illustrating a combination hexagonal/quadrangle mirror array.

Another alternative embodiment of the kaleidoscope is shown in FIG. 6. Therein is shown the tubular housing 10 having a hexagonal 62 mirror array extending from one end 20 of the housing 10 to a point centrally therein. At this point a square mirror array 64 extends to the opposed end 22 of the housing 10.

Figure 7:
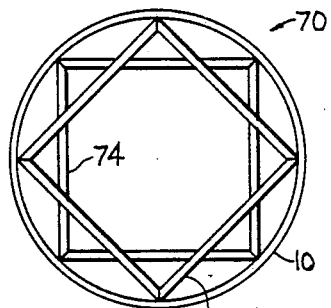
FIG. 7 is a planar end view of an alternative kaleidoscope design illustrating a combination, offset square mirror array.

Another kaleidoscope 70, as shown in FIG. 7, has a double square mirror array located within the tubular housing 10. As such a first square mirror array 72 extends from one end 20 of the housing and terminates its extension at a midpoint therein. At this point a second mirror array 74, 45 degrees off set from the first mirror array 72 as shown, initiates its extension to the opposed end 22 of the tubular housing 12.

Figure 8:
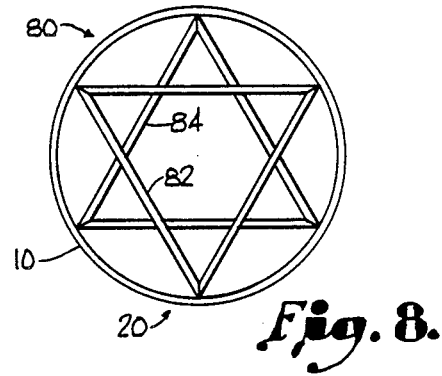
FIG. 8 is a planar end view of an alternative kaleidoscope design illustrating a combination triangular mirror array.

A star shaped kaleidoscope 80 is as shown in FIG. 8. This kaleidoscope 80 comprises first and second relatively offset and successively extending triangular mirror arrays 82, 84. Each mirror array 82, 84 initiates its extension at a selected end 20, 22 of the tubular housing 10 and extends to a terminating midpoint in the tubular housing. As the respective mirror arrays 82, 84 are relatively 180 degrees offset a star, as shown in FIG. 8, is presented.

Figure 9:
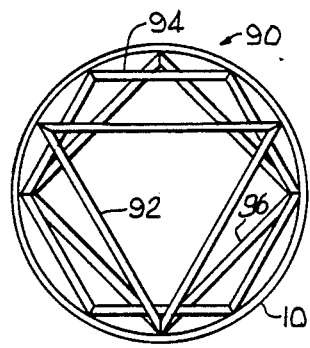
FIG. 9 is a planar end view of an alternative kaleidoscope design illustrating a combination quadrangular/hexagonal/triangular mirror array.

FIG. 9 illustrates a kaleidoscope 90 having a triple mirror array 92, 94, 96 therein. The triangular mirror array 92 begins at one end 20 of the housing 10 and extends through a portion thereof. At this termination the hexagonal mirror array 94 initiates its extension. This hexagonal mirror extension terminates at a point within the tubular housing 12. Subsequently the third quadrangular mirror array 96 initiates its extension and terminates at the opposed end 22 of the housing 10.

Figure 10:
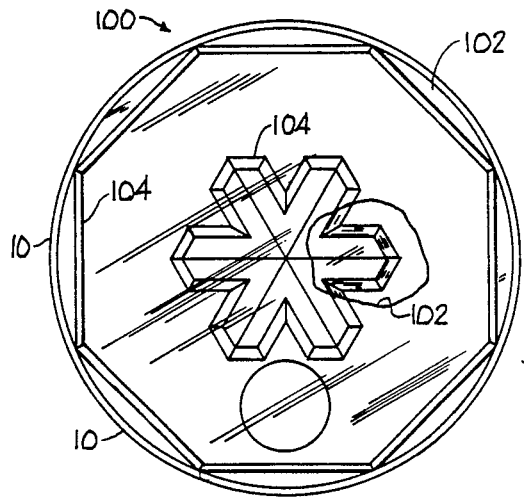
FIG. 10 is a planar end view of an alternative kaleidoscope design illustrating an octagonal mirror array therein with a lens and crystal at one end thereof.

FIG. 10 illustrates a planar view of another alternative kaleidoscope embodiment 100. This kaleidoscope 100 includes the tubular housing 10 with a glass lens 102 at one or both ends 20, 22 thereof. Extending through the tubular housing 10 is an octagonal mirror array 104 which terminates at the opposed end 22 of the housing 10. At either end a snow flake type of crystal/prism 104 is positioned. The user can then view the object through the kaleidoscope proximal end with the reflected image being affected by the octagonal mirror array/crystal 104/lens 102 combination.

Figure 11:
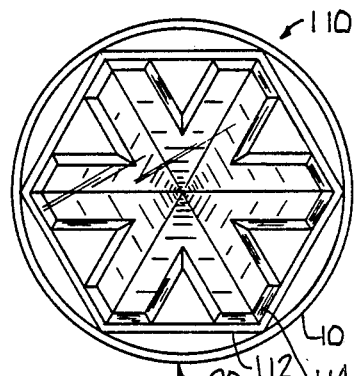
FIG. 11 is a planar end view of an alternative kaleidoscope design illustrating an hexagonal mirror array with a snowflake like crystal at one end thereof.

FIG. 11 illustrates another embodiment 110 of a kaleidoscope. A hexagonal mirror array 112 extends through the tubular housing 10. At one end of the mirror array 112 a crystal 114 is mounted. Reflections of light from the viewed object are affected by the crystal/prism so a to aesthetically affect the reflected image on the mirror array.

Figure 12:
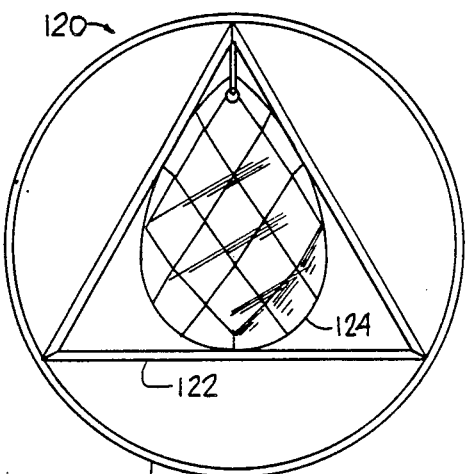
FIG. 12 is a planar end view of an alternative kaleidoscope design illustrating a triangular mirror array with a multi-faceted crystal at one end thereof.

FIG. 12 illustrates a kaleidoscope 120 having a triangular mirror array 122 extending through the length of the housing 10. At one end of the mirror array 122 a crystal prism 124 is suspended. Again the reflection of the viewed object is affected by the prism.

Figure 13:
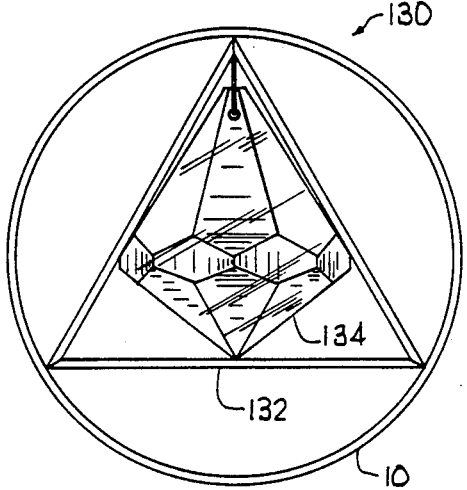
FIG. 13 is a planar end view of an alternative kaleidoscope design illustrating a triangular mirror array with a crystal prism at one open end thereof.

Another kaleidoscope 130 is illustrated in FIG. 13 as having a triangular mirror array 132 extending through the housing 10. At one end of the mirror array is suspended a diamond shaped prism 134 for viewing objects therethrough.

It is understood that the combination of the prisms, as discussed in FIGS. 10–13, with the mirror arrays enhances the viewed image as opposed through the prisms alone. The prism breaks up the viewed image into a rosette pattern prior to reflecting the same on the mirror array. This combination enhances the aesthetic effect of the resulting reflections of the viewed image.

Figure 14:
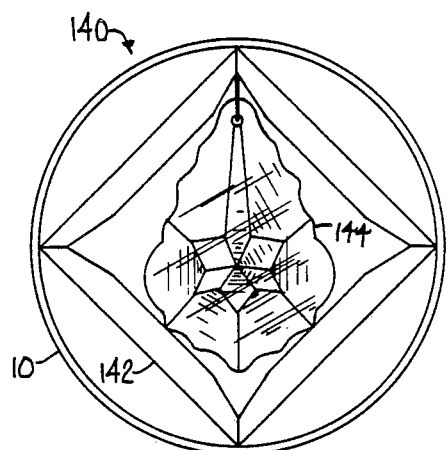
FIG. 14 is a planar view of an alternative kaleidoscope design illustrating a quadrangular, beveled mirror array with a crystal at one open end thereof.

FIG. 14 illustrates a kaleidoscope 140 having a quadrangular mirror array 142 extending therethrough. The mirror array 142 is made of beveled glass or the like. At one end is hung a crystal prism 144 for viewing therethrough. The beveled glass interrupts the reflected image thereon so as to affect the normal reflection seen on planar glass.

Figure 15:
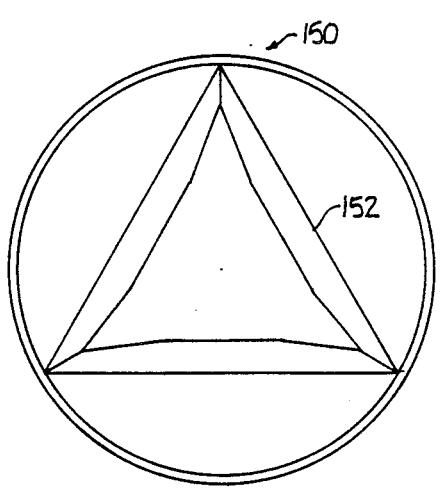
FIG. 15 is a planar end view of an alternative kaleidoscope design illustrating a triangular beveled mirror array.

FIG. 15 illustrates another embodiment 15 of a kaleidoscope having a triangular mirror array 152 made of beveled glass extending therethrough. The beveled glass may be used so as to affect the reflections of the viewed image thereon as opposed to the reflections on a planar type of mirror array.

FIG. 16 illustrates a kaleidoscope 160 having an oval housing 162 therein. Extending through the kaleidoscope is a pentagonal mirror array 164 made up of seven triangular mirror arrays arranged to present an overall pentagonal configuration. At one end of the kaleidoscope is located a color wheel 166 having colored glass or acetate lenses 168a, 168b, 168c therein.

Another kaleidoscope 170 is shown in FIGS. 17 and 18. A variously configured mirror array 172 extends through the housing 174. At the opposed end of the housing 174 is an appended housing 176 having first and second spaced apart glass plates 178, 180. Between the plates are located beads, baubles 182 and the like. The attachment of the appendage 176 is best illustrated in FIG. 18. A portion of the housing 174 is broken away to show the beads, etc. 182 therein. Again the light reflected onto the mirror array is influenced by its passage through the baubles/beads, etc.

In the above described kaleidoscopes it is understood that each kaleidoscope has a proximal viewing end and a distal end. In most of the disclosed kaleidoscopes these ends can be reversed. As such according to the user's preference, the user can focus the kaleidoscope on various objects through either end and observe the images reflected therein. The reflected image may differ according to which end is used as the proximal viewing end. In connection with said kaleidoscopes the above-identified method can be used so that the kaleidoscopic user can translate the viewed kaleidoscope image into a fixed drawing or the like.

Although various forms of this invention have been above described, it is to be understood that such invention is not to be limited thereto except as set forth in the following claims and functional equivalents thereof.

What I claim is:

1. In a kaleidoscope having an elongated housing with a proximal end and a distal end, the improvement comprising:
    a plurality of reflective members forming a mirror array of a desired cross section, said array longitudinally extending through said housing and dividing the interior of said housing into predetermined cross-sectional areas corresponding to the cross-sectional configuration of said mirror array, said mirror array at said distal end reflecting the image of an object sighted through said proximal end throughout the extent of said mirror array, wherein said mirror array comprises:
        a hexagonal mirror array extending through the housing from said proximal end towards said distal end; and
        a triangular mirror array extending through said housing from said distal end towards said proximal end whereby said reflected image varies according to the end of said housing through which said object is viewed.

2. In a kaleidoscope having an elongated housing with a proximal end and a distal end, the improvement comprising:
    a plurality of reflective members forming a mirror array of a desired cross section, said array longitudinally extending through said housing and dividing the interior of said housing into predetermined cross-sectional areas corresponding to the cross-sectional configuration of said mirror array, said mirror array at said distal end reflecting the image of an object sighted through said proximal end throughout the extent of said mirror array, wherein said mirror array comprises:
        a hexagonal mirror array extending through the housing from said proximal end towards said distal end; and
        a quadrangular mirror array extending through said housing from said distal end towards said proximal end whereby said reflected image varies according to the end of said housing through which said object is viewed.

3. In a kaleidoscope having an elongated housing with a proximal end and a distal end, the improvement comprising:
    a plurality of reflective members forming a mirror array of a desired cross section, said array longitudinally extending through said housing and dividing the interior of said housing into predetermined cross-sectional areas corresponding to the cross-sectional configuration of said mirror array, said mirror array at said distal end reflecting the image of an object sighted through said proximal end throughout the extent of said mirror array, wherein said mirror array comprises:
- a first rectangular mirror array extending through the housing from said proximal end towards said distal end; and
- a second rectangular mirror array offset from said first mirror array and extending through said housing from said distal end towards said proximal end whereby said reflected images varies according to the end of said housing through which said object is viewed.

4. In a kaleidoscope having an elongated housing with a proximal end and a distal end, the improvement comprising:
- a plurality of reflective members forming a mirror array of a desired cross section, said array longitudinally extending through said housing and dividing the interior of said housing into predetermined cross-sectional areas corresponding to the cross-sectional configuration of said mirror array, said mirror array at said distal end reflecting the image of an object sighted through said proximal end throughout the extent of said mirror array, wherein said mirror array comprises:
  - a first triangular mirror array extending from said proximal end towards said distal end; and
  - a second triangular mirror array extending from said distal end towards said proximal end with the latter being offset relative to said first mirror array.

5. In a kaleidoscope having an elongated housing with a proximal end and a distal end, the improvement comprising:
- a plurality of reflective members forming a mirror array of a desired cross section, said array longitudinally extending through said housing and dividing the interior of said housing into predetermined cross-sectional areas corresponding to the cross-sectional configuration of said mirror array, said mirror array at said distal end reflecting the image of an object sighted through said proximal end throughout the extent of said mirror array, wherein said mirror array comprises:
  - a first triangular mirror array extending through a portion of said housing;
  - a second hexagonal mirror array extending through a portion of said housing; and
  - a third quadrangular mirror array extending through a portion of said housing whereby to present a kaleidoscope presenting differing reflected images therein according to the end of said housing through which said object is viewed.

6. In a kaleidoscope having an elongated housing with a proximal end and a distal end, the improvement comprising:
- a plurality of reflective members forming a mirror array of a desired cross section, said array longitudinally extending through said housing and dividing the interior of said housing into predetermined cross-sectional areas corresponding to the cross-sectional configuration of said mirror array, said mirror array at said distal end reflecting the image of an object sighted through said proximal end throughout the extent of said mirror array;
- a color wheel having a plurality of colored lenses therein; and
- means for mounting said color wheel at one end of said housing whereby said reflected image passes through said color wheel and onto said mirror array.

* * * * *